United States Patent
Tamura

(10) Patent No.: US 9,431,867 B2
(45) Date of Patent: Aug. 30, 2016

(54) ROTATING ELECTRICAL MACHINE

(71) Applicant: HONDA MOTOR CO., LTD., Tokyo (JP)

(72) Inventor: Sayaka Tamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 192 days.

(21) Appl. No.: 14/014,358

(22) Filed: Aug. 30, 2013

(65) Prior Publication Data

US 2014/0062235 A1     Mar. 6, 2014

(30) Foreign Application Priority Data

Aug. 31, 2012   (JP) ................................ 2012-192618

(51) Int. Cl.
| | | |
|---|---|---|
| *H02K 5/10* | (2006.01) | |
| *H02K 5/22* | (2006.01) | |
| *H02K 5/12* | (2006.01) | |

(52) U.S. Cl.
CPC ................ *H02K 5/225* (2013.01); *H02K 5/12* (2013.01)

(58) Field of Classification Search
CPC ........... H02K 5/225; H02K 5/12; H02K 5/10
USPC .............................................. 310/87, 71, 88
See application file for complete search history.

(56) References Cited

U.S. PATENT DOCUMENTS

| | | | | |
|---|---|---|---|---|
| 4,491,754 A | * | 1/1985 | Gotoh ...................... | H02K 5/10 310/43 |
| 4,544,166 A | * | 10/1985 | Karasawa ................. | B60S 1/08 277/590 |
| 4,893,039 A | * | 1/1990 | Isii ........................... | B60S 1/16 310/88 |
| 4,945,270 A | * | 7/1990 | Okamoto ................ | F02N 15/00 29/596 |
| 4,978,875 A | * | 12/1990 | Okamoto ................ | F02N 15/00 310/43 |
| 5,010,265 A | * | 4/1991 | Tanaka .................... | F02N 15/00 290/48 |
| 5,053,633 A | * | 10/1991 | Sugiyama ............... | F02N 15/00 290/48 |
| 5,101,114 A | * | 3/1992 | Isozumi .................. | F02N 11/00 290/48 |

(Continued)

FOREIGN PATENT DOCUMENTS

| | | | |
|---|---|---|---|
| JP | 59-063655 | * | 4/1984 |
| JP | 59-063655 U | | 4/1984 |

(Continued)

OTHER PUBLICATIONS

English translation of JP 2009284659; Dec. 2009, Japan, Tsutsui Takahiro.*

(Continued)

*Primary Examiner* — Terrance Kenerly
*Assistant Examiner* — Ahmed Elnakib
(74) *Attorney, Agent, or Firm* — Mori & Ward, LLP

(57) ABSTRACT

A rotating electrical machine includes a stator, a rotor, a case, a seal member, and a terminal board. The stator has a conductor line wound thereon. The rotor is disposed inside the stator. The terminal board is to make an electrical connection between the conductor line and an external power line connected to a power supply. The terminal board is contained in the case and includes a relay conductor and a storage chamber containing the relay conductor. The relay conductor is to make a connection between the conductor line and the external power line. The storage chamber is hermetically closed by the seal member with respect to an outside of the case. The storage chamber has a discharge hole that allows communication between the storage chamber and the outside.

8 Claims, 6 Drawing Sheets

(56) References Cited

U.S. PATENT DOCUMENTS

| | | | | |
|---|---|---|---|---|
| 5,747,904 | A * | 5/1998 | Sudhoff | H02K 5/10 310/58 |
| 6,705,349 | B2 * | 3/2004 | Themudo | F01M 13/0405 138/89 |
| 7,893,581 | B2 | 2/2011 | Miura et al. | |
| 2007/0296291 | A1 * | 12/2007 | Watson | E21B 43/128 310/71 |
| 2011/0127829 | A1 * | 6/2011 | Hayashi et al. | 303/6.01 |
| 2012/0212089 | A1 * | 8/2012 | Sakurada | 310/71 |

FOREIGN PATENT DOCUMENTS

| | | | |
|---|---|---|---|
| JP | EP 0716010 | * | 6/1996 |
| JP | 09-308203 | | 11/1997 |
| JP | 2003-158851 | | 5/2003 |
| JP | 2004-122979 | | 4/2004 |
| JP | 2004-327184 | | 11/2004 |
| JP | 2006-296133 | | 10/2006 |
| JP | 2008-278678 | | 11/2008 |
| JP | 2009-284659 | | 12/2009 |
| JP | 2009284659 | * | 12/2009 |
| WO | WO 2008/007806 | | 1/2008 |

OTHER PUBLICATIONS

English translation of JP 59-063655; Apr. 1984, Japan, Ando et al.*

Japanese Office Action for corresponding JP Application No. 2012-192618, Jun. 16, 2014.

* cited by examiner

ROTATING ELECTRICAL MACHINE

CROSS-REFERENCE TO RELATED APPLICATIONS

The present application claims priority under 35 U.S.C. §119 to Japanese Patent Application No. 2012-192618, filed Aug. 31, 2012, entitled "Rotating Electrical Machine." The contents of this application are incorporated herein by reference in their entirety.

BACKGROUND OF THE INVENTION

1. Field of the Invention

The present disclosure relates to a rotating electrical machine.

2. Discussion of the Background

Rotating electrical machines (e.g., motors) have been known in which a plurality of coils wound in slots of a stator produce a rotating magnetic field to rotate a rotor in the center of the stator. Such a rotating electrical machine has three-phase feeder lines for supplying power to conductor lines, such as coils, and a terminal board for connection between the feeder lines and a power supply. For example, the terminal board includes a main body secured to a housing containing the stator and the rotor, busbars attached to the main body and connected to the respective feeder lines, and a cover attached to the main body to cover the busbars. Terminals connected to the feeder lines are connected to respective one ends of the busbars made of a conductive material, and terminals of cables connected to the power supply are connected to the respective other ends of the busbars (see, e.g., Japanese Unexamined Patent Application Publication No. 2004-327184).

SUMMARY OF THE INVENTION

According to one aspect of the present invention, a rotating electrical machine includes a stator, a rotor, a case, a seal member, and a terminal board. The stator has a conductor line wound thereon. The rotor is disposed inside the stator. The terminal board is to make an electrical connection between the conductor line and an external power line connected to a power supply. The terminal board is contained in the case and includes a relay conductor and a storage chamber containing the relay conductor. The relay conductor is to make a connection between the conductor line and the external power line. The storage chamber is hermetically closed by the seal member with respect to an outside of the case. The storage chamber has a discharge hole that allows communication between the storage chamber and the outside.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
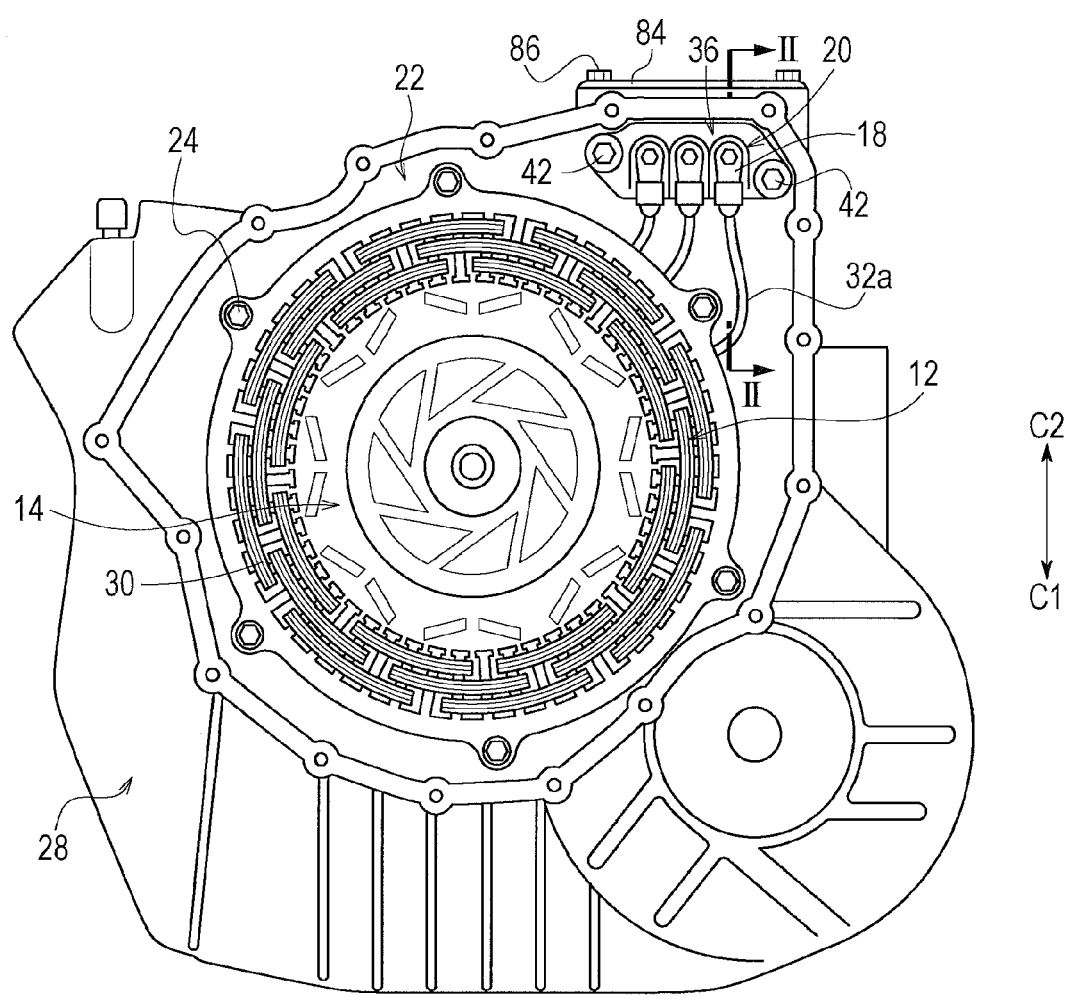
FIG. 1 is an external front view of a rotating electrical machine according to an embodiment of the present disclosure, the rotating electrical machine being contained in a motor case.

The embodiments will now be described with reference to the accompanying drawings, wherein like reference numerals designate corresponding or identical elements throughout the various drawings.

In FIG. 1, reference numeral 10 denotes a rotating electrical machine according to an embodiment of the present disclosure.

For example, the rotating electrical machine 10 is a three-phase alternating current brushless motor. As illustrated in FIG. 1, the rotating electrical machine 10 includes an annular stator 12, a rotor 14 inserted in the center of the stator 12, and a terminal board 20 that makes a connection between three-phase motor terminals 18 and a power supply (not shown). The rotating electrical machine 10 drives the rotor 14 to rotate on the basis of power supplied from the power supply (not shown) through the motor terminals 18.

Figure 2:
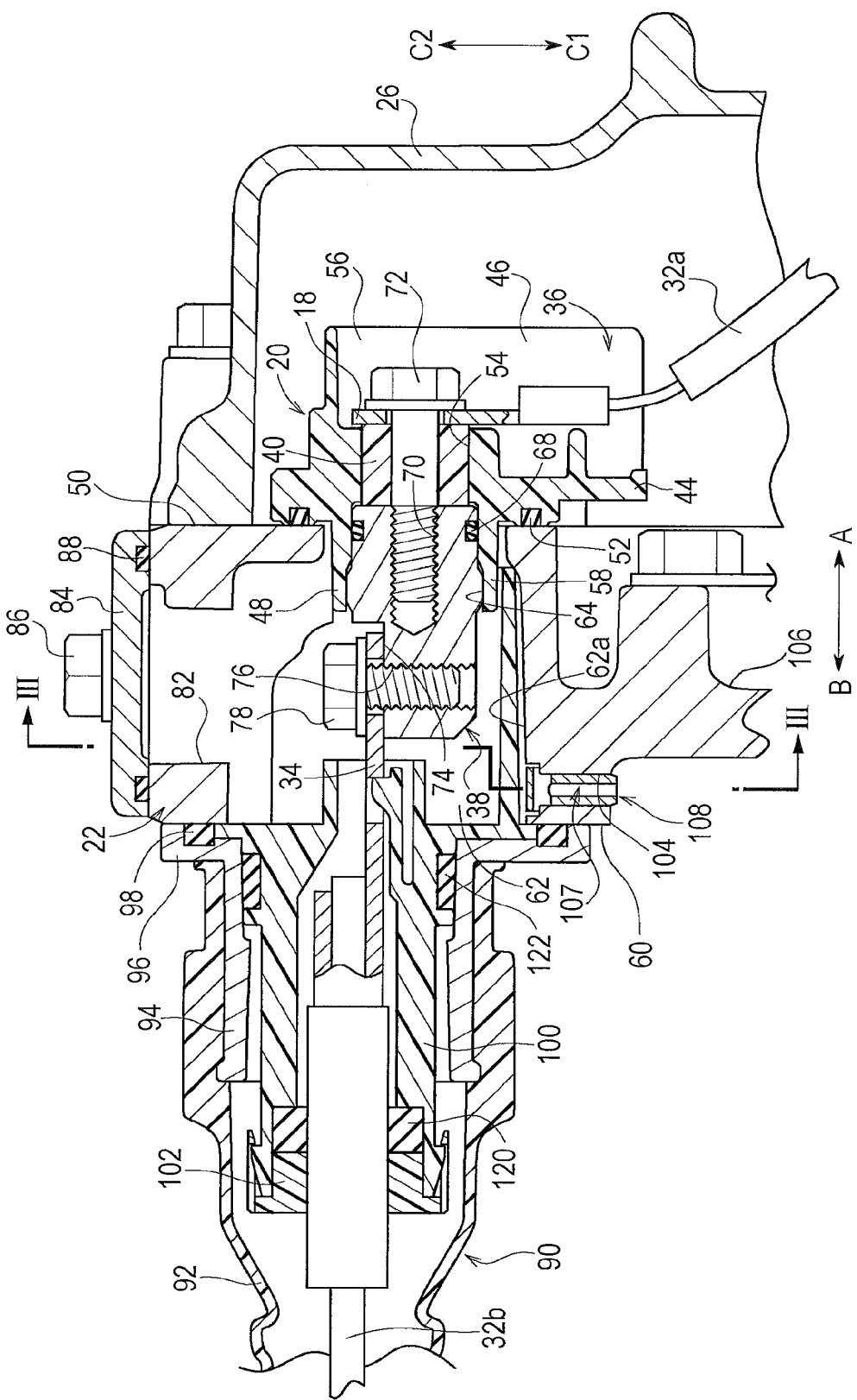
FIG. 2 is a cross-sectional view taken along line II-II of FIG. 1.

The rotating electrical machine 10 is contained in an annular motor case (case) 22, to which the stator 12 is secured with bolts 24. At the same time, as illustrated in FIG. 2, a motor case cover 26 is attached to one end of the motor case 22, and a transmission case 28 containing a transmission mechanism for a vehicle is connected to the other end of the motor case 22. The internal structure of the motor case 22 is thus obtained.

For example, the stator 12 is formed by a plurality of steel plates that are stacked and connected together in the axial direction and integrally held by caulking or welding. A plurality of coils 30 are mounted in slots of the stator 12 and connected to the three-phase motor terminals 18.

The motor case 22 is provided with the terminal board 20 that makes a connection between the motor terminals 18 and power supply terminals 34. The motor terminals 18 include a U-phase terminal, a V-phase terminal, and a W-phase terminal. The power supply terminals 34 are connected to a power control unit (power distribution unit (PDU)) that controls the amount of power supply from the power supply (not shown) to the rotating electrical machine 10.

As illustrated in FIG. 2, the terminal board 20 includes a body 36 mounted inside the motor case 22, bus rods (relay conductors) 38 inserted and held in the body 36, and collars 40 disposed coaxially with the respective bus rods 38.

For example, the body 36 is made of a resin material, which is a non-conductive material. The body 36 includes a base portion 44, a first retainer 46, and a second retainer 48. The base portion 44 is secured to the motor case 22 by inserting a pair of fastening bolts 42 into a pair of collars (not shown) inserted in the body 36. The first retainer 46 protrudes from one side of the base portion 44 (in the direction of arrow A) and has the three-phase motor terminals 18 inserted therein. The second retainer 48 protrudes from the other side of the base portion 44 (in the direction of arrow B) and holds the bus rods 38.

The base portion 44 is substantially in the shape of a rectangle having a predetermined width. The pair of fastening bolts 42 is inserted into holes at both ends of the base portion 44 in the width direction. The fastening bolts 42 are screwed into respective screw holes (not shown), with the base portion 44 being in contact with a first mounting surface 50 formed in an inner wall surface of the motor case 22. This allows the terminal board 20 to be secured, at the base portion 44, to the interior of the motor case 22. As illustrated in FIG. 2, the terminal board 20 is secured in place such that the first retainer 46 faces toward one end of the motor case 22 (in the direction of arrow A) to which the motor case cover 26 is attached, and that the second retainer 48 faces toward the transmission case 28 (in the direction of arrow B).

An end face of the base portion 44 is provided with a first seal ring (seal member) 52 mounted in an annular groove facing the motor case 22. When the body 36 is assembled in the motor case 22, the first seal ring 52 is in contact with the inner wall surface of the motor case 22. This prevents lubricating oil (e.g., automatic transmission fluid (ATF) for cooling the rotating electrical machine 10) in the motor case 22 from entering a storage hole (storage chamber) 62 formed between the first mounting surface 50 and a second mounting surface 60 of the motor case 22.

The base portion 44 is provided with through holes 54 extending from the first retainer 46 to the second retainer 48. The collars 40 having a cylindrical shape are coaxially disposed inside the respective through holes 54. For example, the collars 40 are made of a metal material, which is a conductive material, and are integrally formed by insert molding in the through holes 54.

The first retainer 46 has first protective walls 56 arranged side by side across the width of the base portion 44. The first protective walls 56 stand on the base portion 44 and are U-shaped in cross section. The first protective walls 56 are provided as many as the number of the three-phase motor terminals 18. The through holes 54 are formed in the respective centers of the first protective walls 56. The motor terminals 18 are inserted into the respective first protective walls 56 which divide the first retainer 46. Cables 32a connected to the respective motor terminals 18 are led out downward (in the direction of arrow C1) through the open portions of the first protective walls 56.

The first protective walls 56 are provided as division walls that prevent a short circuit caused by contact between the adjacent motor terminals 18.

Figure 3:
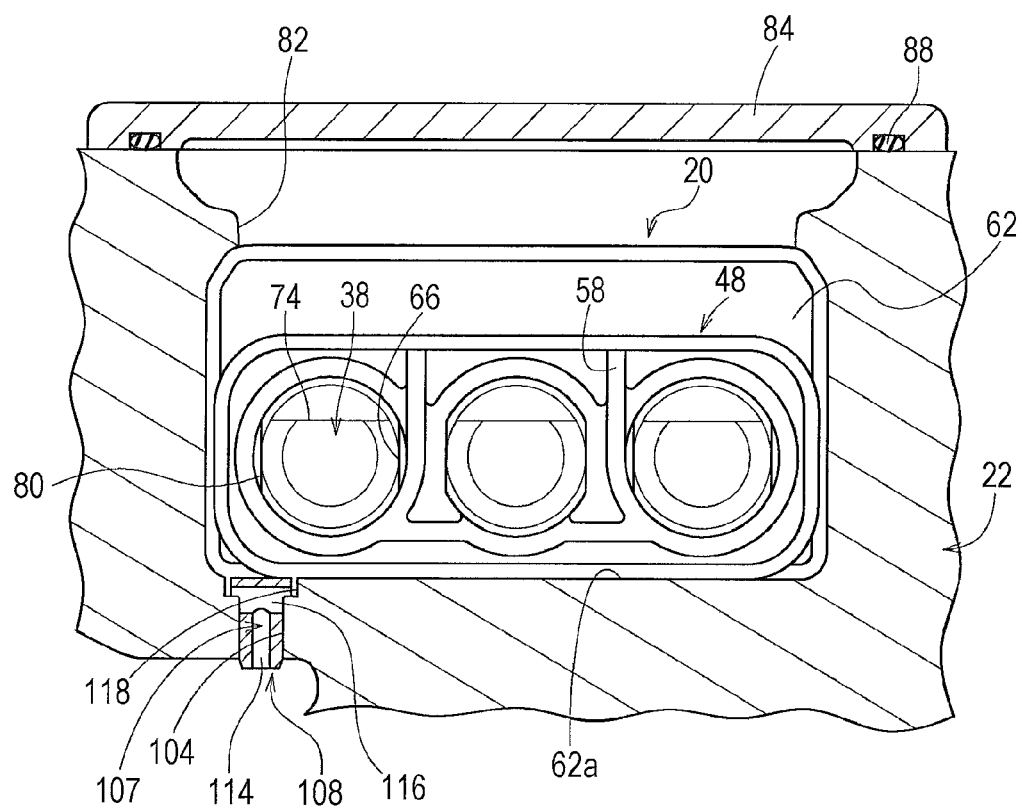
FIG. 3 is a cross-sectional view taken along line of FIG. 2.

As illustrated in FIG. 3, and similar to the first retainer 46, the second retainer 48 has three second protective wall 58 arranged side by side across the width of the base portion 44. The second protective walls 58 cylindrically protrude by a predetermined distance from the base portion 44. The second protective walls 58 are inserted into the storage hole (storage chamber) 62 formed between the first mounting surface 50 and the second mounting surface 60 of the motor case 22, and are internally provided with respective insertion holes 64 for insertion of the bus rods 38. The insertion holes 64 are coaxial with the respective through holes 54. The second protective walls 58 are provided for the purpose of preventing a short circuit caused by contact between the adjacent power supply terminals 34.

The bus rods 38 are shaft-like members made of a conductive material, such as a metal material. As illustrated in FIG. 2, one ends of the bus rods 38 are inserted into the respective insertion holes 64 of the second retainer 48 and held in the body 36, whereas the other ends of the bus rods 38 protrude from the second retainer 48 and are disposed inside the storage hole 62. In the storage hole 62, the power supply terminals 34 of cables 32b connected to the power control unit (not shown) are connected to the respective bus rods 38. As illustrated in FIG. 3, three bus rods 38 are provided in accordance with the number of the second protective walls 58 of the second retainer 48.

As illustrated in FIG. 2, one end of each of the bus rods 38 is provided with a rod seal 68 mounted in an annular groove in the outer surface of the bus rod 38. The rod seal 68 is in contact with the inner surface of the corresponding insertion hole 64. This prevents entry of lubricating oil through a space between the bus rod 38 and the second retainer 48 having the insertion hole 64.

Also, the one end of each of the bus rods 38 is provided with a first bolt hole 70 extending toward the other end of the bus rod 38 (in the direction of arrow B). The first bolt hole 70 has a predetermined length in the axial direction (in the direction of arrow B), and is coaxial with the corresponding collar 40. First terminal bolts 72 for fastening the motor terminals 18 to the first retainer 46 of the terminal board 20 are screwed through the collars 40 into the respective first bolt holes 70.

The other end of each of the bus rods 38 has a terminal mounting portion 74 which is a planar portion formed by cutting the bus rod 38 along the axis (in the direction of arrows A and B). The power supply terminals 34 are connected to the respective terminal mounting portions 74. The terminal mounting portions 74 are provided with respective second bolt holes 76 passing through the bus rods 38 in the direction orthogonal to the axes of the bus rods 38 (in the direction of arrow C1). Second terminal bolts 78 (described below) are screwed into the respective second bolt holes 76. The bus rods 38 are positioned to allow the second bolt holes 76 to face in the upward direction in the motor case 22 (in the direction of arrow C2).

Additionally, as illustrated in FIG. 3, each of the bus rods 38 has a pair of planar portions 80 in the outer surface between the one and other ends thereof. The planar portions 80 are substantially parallel to the axis of the bus rod 38 (i.e., substantially parallel to the direction of arrows A and B). For example, the planar portions 80 are formed to be symmetric with respect to the axis of the bus rod 38. When the bus rod 38 is inserted into the corresponding insertion hole 64 of the second retainer 48, the planar portions 80 come into contact and engage with respective flat portions 66 of the insertion hole 64. This regulates the rotational displacement of the bus rod 38 in the insertion hole 64.

That is, the planar portions 80 of the bus rod 38 and the flat portions 66 of the insertion hole 64 engage with each other to serve as a rotation stopper that regulates the rotational displacement of the bus rod 38 with respect to the body 36 having the insertion hole 64.

As illustrated in FIG. 2, the outer surface of the motor case 22 is provided with a work opening 82 that faces the other ends of the bus rods 38 of the terminal board 20. The work opening 82 has a size that allows the three bus rods 38 arranged side by side to be viewed from outside the motor case 22. The work opening 82 opens in a substantially rectangular shape that allows communication between the inside and the outside of the motor case 22. A substantially rectangular terminal cover 80 corresponding to the work opening 82 is mounted over the work opening 82. The terminal cover 84 is secured to the motor case 22 by screwing fixing bolts 86 inserted in respective holes at both ends of the terminal cover 84 in the width direction. The work opening 82 is thus closed.

An end face of the terminal cover 84 facing the motor case 22 (in the direction of arrow C1) is provided with a second seal ring 88 mounted in an annular groove. When the terminal cover 84 closes the work opening 82, the second seal ring 88 comes into contact with the motor case 22. This prevents entry of water from the outside through a space between the motor case 22 and the terminal cover 84.

A power supply connection portion 90 has the power supply terminals 34 connected to respective ends of the cables 32*b* connected to the power control unit (not shown). The power supply terminals 34 and the cables 32*b* are partially covered with a waterproof cover 92 made of, for example, a resin material. A socket 94 is integrally mounted on an end portion of the waterproof cover 92.

The cables 32*b* are connected by fusing or the like to respective one ends of the power supply terminals 34. The other ends of the power supply terminals 34 have a plate-like shape and are provided with respective terminal holes. With the other ends of the power supply terminals 34 placed on the respective terminal mounting portions 74 of the bus rods 38, the second terminal bolts 78 are screwed through the respective terminal holes into the second bolt holes 76 of the bus rods 38. This allows the power supply terminals 34 to be connected to the respective other ends of the bus rods 38.

With the power supply terminals 34 fastened to the respective bus rods 38, a flange 96 at an end of the socket 94 comes into contact with the second mounting surface 60 of the motor case 22. This allows a first seal member (seal member) 98 mounted in an annular groove in an end face of the flange 96 to be in contact with the second mounting surface 60. Thus, it is possible to prevent entry of water from the outside through a space between the flange 96 and the second mounting surface 60.

Figure 4:
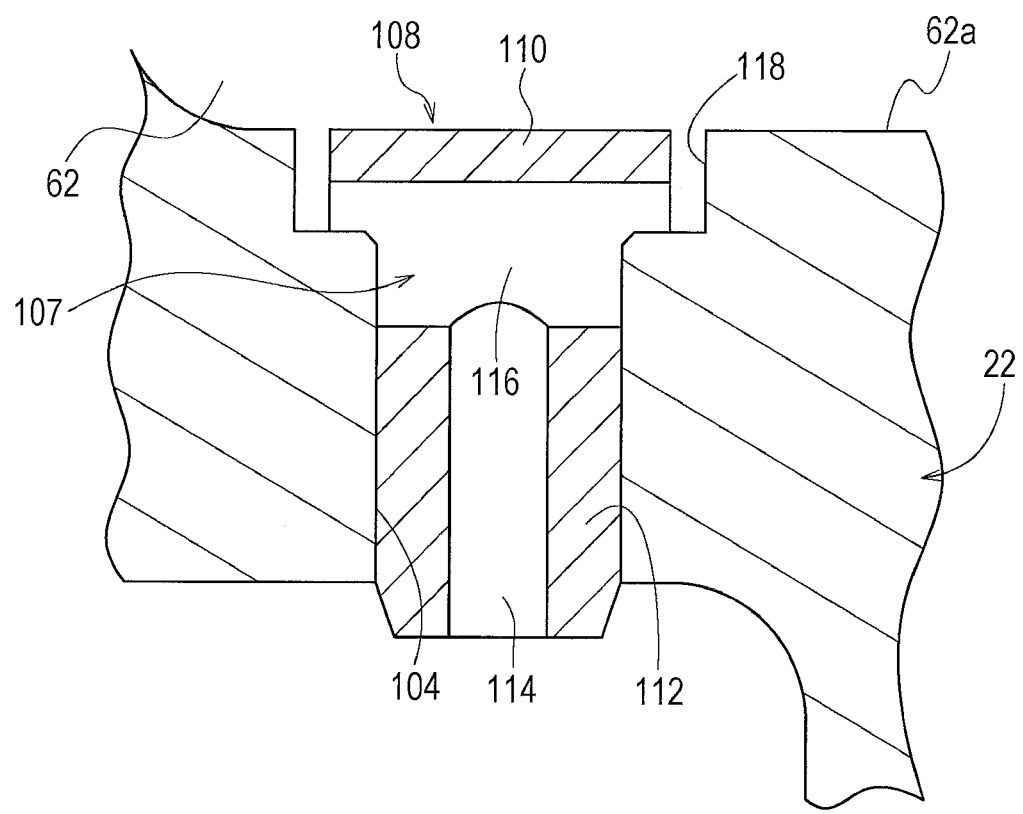
FIG. 4 is an enlarged cross-sectional view of a discharge plug and its vicinity illustrated in FIG. 3.

The socket 94 is internally provided with a cylindrical holder 100 and a guide body 102 connected to one end of the holder 100. The holder 100 and the guide body 102 are configured to hold the power supply terminals 34. The other end (or extremity) of the holder 100 is inserted and secured in the storage hole 62 of the motor case 22. As illustrated in FIGS. 3 and 4, the storage hole 62 facing the extremity of the holder 100 is provided with a discharge port (discharge hole) 104 extending downward (in the direction of arrow C1 in FIG. 2). As illustrated in FIG. 2, the discharge port 104 is formed to allow a bottom surface 62*a* of the storage hole 62 to communicate with a recessed portion 106 below the storage hole 62. This allows communication between the inside of the storage hole 62 and the outside of the motor case 22. The discharge port 104 is located below the bus rods 38 disposed in the storage hole 62. The bottom surface 62*a* of the storage hole 62 is inclined downward toward the second mounting surface 60 (in the direction of arrow B).

A discharge plug 108 having a discharge path 107 therein is press-fitted into an end of the discharge port 104 adjacent to the storage hole 62. The discharge path 107 allows communication between the storage hole 62 and the outside.

As illustrated in FIG. 4, the discharge plug 108 has a head portion 110 substantially elliptical in cross section, and a shaft portion 112 extending axially from the center of the head portion 110. The discharge path 107 has a first path portion 114 extending inside the shaft portion 112, and a second path portion 116 formed at a boundary between the shaft portion 112 and the head portion 110. The first path portion 114 axially passes through the shaft portion 112, and the second path portion 116 is a through path orthogonal to the first path portion 114. The head portion 110 of the discharge plug 108 is inserted into a recess 118 in the bottom surface 62*a* of the storage hole 62 while the shaft portion 112 is press-fitted into the discharge port 104. Thus, the discharge plug 108 is secured in place, with the discharge port 104 and the discharge path 107 communicating with each other.

As illustrated in FIG. 2, the boundary between the holder 100 and the guide body 102 is internally provided with an annular second seal member 120. Since the second seal member 120 is in contact with the outer surfaces of the power supply terminals 34, it is possible to prevent entry of moisture through a space between the holder 100 and the power supply terminals 34 toward the bus rods 38.

Additionally, a third seal member 122 is mounted in an annular groove in the outer surface of the holder 100. Since the third seal member 122 is in contact with the inner surface of the socket 94, it is possible to prevent entry of water through a space between the holder 100 and the socket 94.

When the power supply connection portion 90 is assembled to the motor case 22, the holder 100 is partially inserted into the motor case 22 and the inserted end portion of the holder 100 engages with the second retainer 48 of the body 36.

The rotating electrical machine 10 according to an embodiment of the present disclosure is basically configured as described above. A description will now be given of an increase in pressure inside the terminal board 20.

For example, when an electric current from the power supply passes through the power supply connection portion 90, the bus rods 38, and the motor terminals 18 and is applied to the coils 30, the bus rods 38 generate heat by the passage of electric current. This increases pressure inside the storage hole 62 closed by the first seal ring 52 in the body 36 of the terminal board 20 and the first seal member 98 of the power supply connection portion 90.

The increase in pressure causes air inside the storage hole 62 to be discharged from the discharge port 104, through the discharge path 107 of the discharge plug 108, to the outside of the motor case 22. Thus, the pressure inside the storage hole 62 becomes equal to the atmospheric pressure outside the motor case 22. Therefore, it is possible to prevent an increase in pressure inside the storage hole 62, and prevent application of excessive pressure to the first seal ring 52 and the first seal member 98 caused by the increase in pressure.

If condensation occurs in the storage hole 62 due to changes in air temperature outside the rotating electrical machine 10, moisture from the condensation moves to the bottom surface 62*a* of the storage hole 62 and is guided along the bottom surface 62*a* to the discharge port 104. Then, after moving along the discharge port 104 to the discharge plug 108, the moisture flows through the discharge path 107 and is discharged to the outside. Specifically, the moisture moves from the bottom surface 62*a* of the storage hole 62 to the recess 118, flows from the second path portion 116 to the first path portion 114 in the discharge plug 108, and is discharged through the discharge port 104 to the recessed portion 106 of the motor case 22.

As described above, in the rotating electrical machine 10 of the present embodiment, the storage hole 62 of the motor case 22 having the terminal board 20 mounted thereon is provided with the discharge port 104 communicating with the outside, and the discharge plug 108 having the discharge path 107 therein is fitted to an end of the discharge port 104. With this configuration, even if heat is generated by application of electric current to the bus rods 38 and air pressure inside the storage hole 62 containing part of the bus rods 38 increases, the air can be discharged through the discharge port 104 and the discharge plug 108 to the outside of the motor case 22. Therefore, it is possible to prevent an increase in pressure inside the storage hole 62. As a result, it is possible to prevent application of excessive pressure to the first seal ring 52, the first seal member 98, and the rod seals 68 which may be caused by an increase in pressure inside the storage hole 62, and thus to prevent a decrease in durability of the first seal ring 52, the first seal member 98, and the rod seals 68. In other words, it is possible to improve durability of the first seal ring 52, the first seal member 98, and the rod seals 68.

Even if condensation occurs in the storage hole 62, the resulting moisture can be reliably discharged through the discharge port 104 and the discharge plug 108 to the outside of the motor case 22. Therefore, it is possible to prevent a short circuit which may be caused by adhesion of the moisture to the bus rods 38 or to the power supply terminals 34.

As described above, the bottom surface 62a of the storage hole 62 is gradually inclined downward toward the discharge port 104. This allows moisture to move along the bottom surface 62a. Thus, the moisture is appropriately guided to the discharge port 104 and discharged.

The discharge plug 108 fitted to the end of the discharge port 104 is internally provided with the first path portion 114 extending along the discharge port 104 and the second path portion 116 orthogonal to the first path portion 114. Therefore, for example, even when the discharge plug 108 allows communication between the discharge port 104 and the outside of the motor case 22, moisture and dust can be prevented from entering the discharge port 104 from the outside through the first and second path portions 114 and 116. In other words, the first and second path portions 114 and 116 have a labyrinth structure through which moisture and dust cannot easily enter the discharge port 104.

Figure 5:
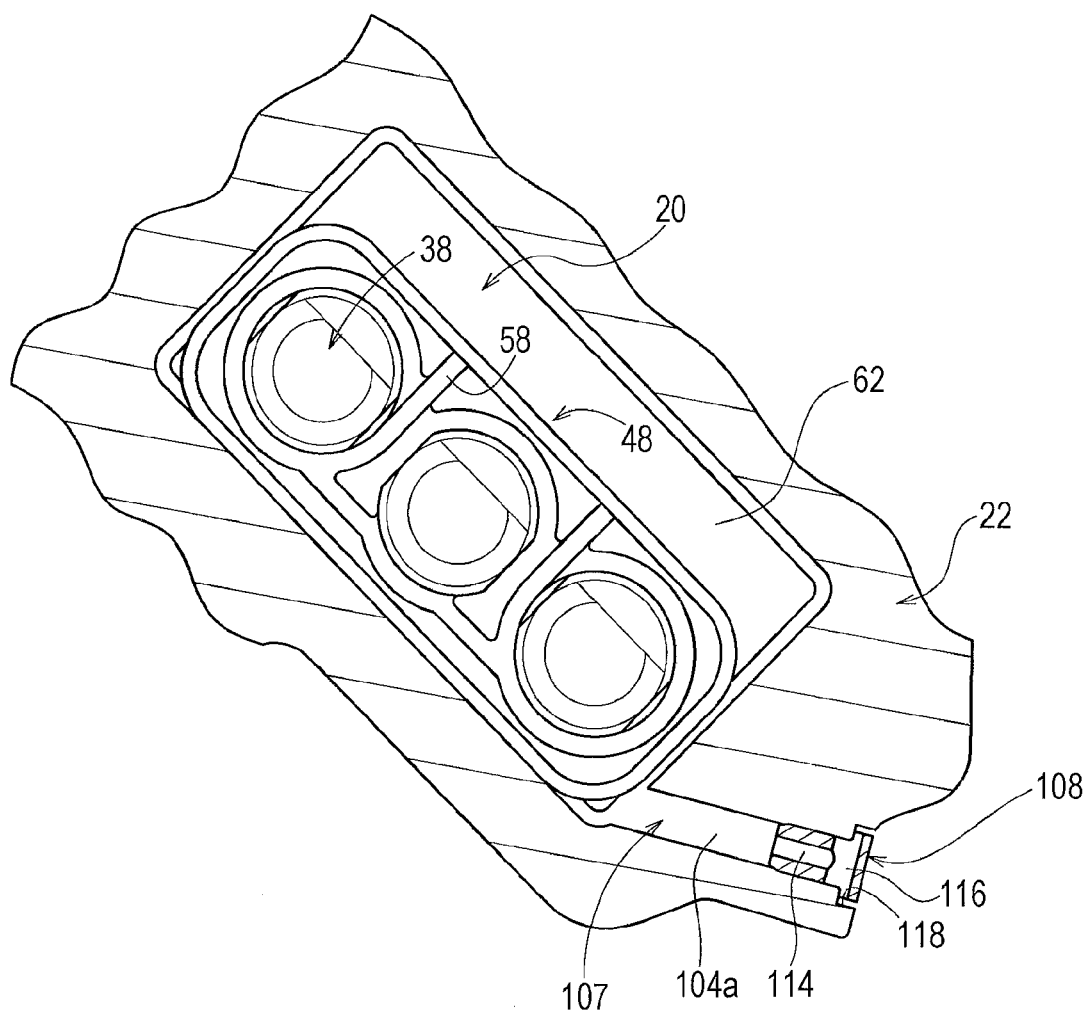
FIG. 5 is a cross-sectional view illustrating a terminal board having a discharge port and a discharge plug according to a modification.
Figure 6:
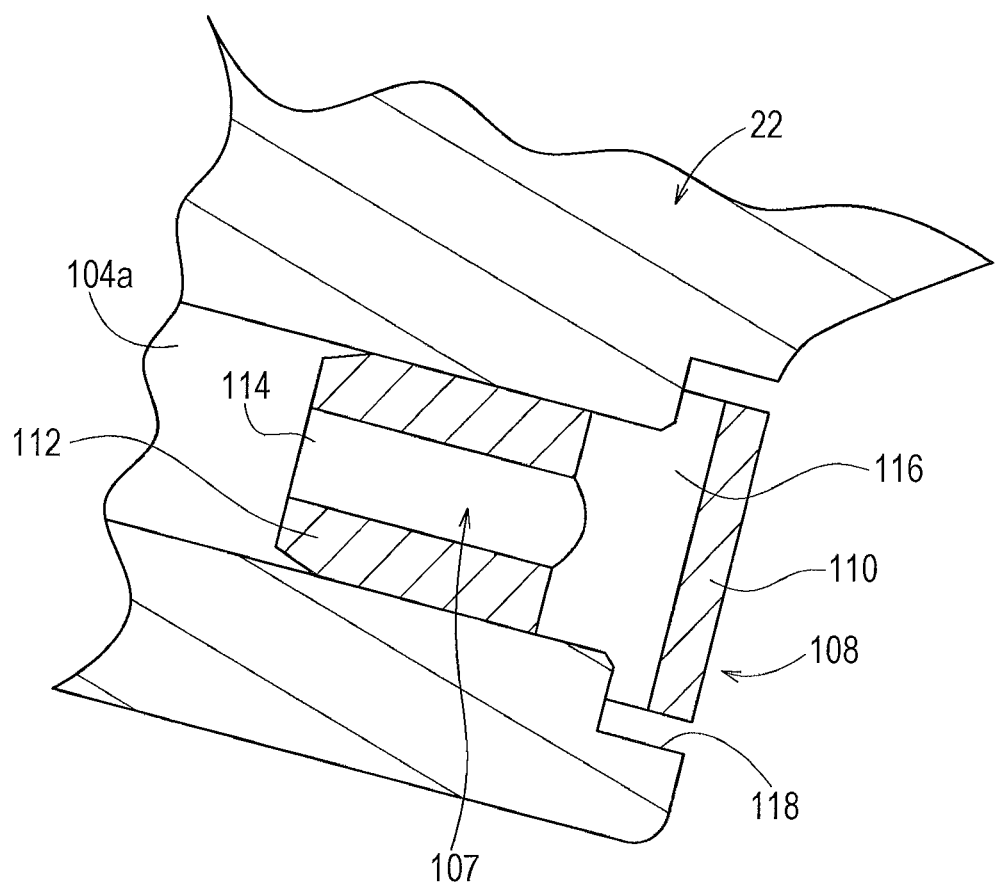
FIG. 6 is an enlarged cross-sectional view of the discharge plug and its vicinity illustrated in FIG. 5.

As illustrated in FIGS. 5 and 6, when the terminal board 20 is inclined by a predetermined angle in the rotating electrical machine 10, the storage hole 62 may be provided with a discharge port 104a that communicates with a lower corner of the terminal board 20, and an end of the discharge port 104a may be provided with the discharge plug 108. Thus, for example, when moisture produced inside the storage hole 62 moves downward under the action of gravity, the moisture can be appropriately drawn into the discharge port 104a and discharged to the outside. When the discharge port 104a and the discharge plug 108 are opened downward to the outside, it is possible to prevent entry of moisture and dust from the outside through the discharge plug 108.

The discharge plug 108 may be disposed at one end of the discharge port 104a adjacent to the storage hole 62, or may be disposed at the other end of the discharge port 104a adjacent to the outside of the motor case 22. The head portion 110 of the discharge plug 108 may be located adjacent to either the storage hole 62 or the outside. That is, the position and the orientation of the discharge plug 108 in the discharge port 104a are not limited, as long as entry of moisture and dust into the discharge port 104a can be prevented by providing the discharge plug 108 having the first and second path portions 114 and 116 intersecting with each other in the discharge port 104a.

The rotating electrical machine according to the present disclosure is not limited to the embodiments described above, and may be configured in various ways without departing from the scope of the present disclosure.

A rotating electrical machine according to the embodiment includes a stator having a conductor line wound thereon, a rotor disposed inside the stator, and a terminal board configured to make an electrical connection between the conductor line and an external power line connected to a power supply. The terminal board is contained in a case and includes a relay conductor and a storage chamber containing the relay conductor. The relay conductor is configured to make a connection between the conductor line and the external power line. The storage chamber is hermetically closed by a seal member to the outside of the case. The storage chamber has a discharge hole that allows communication between the storage chamber and the outside.

In the embodiment, as described above, the storage chamber containing the relay conductor of the terminal board and hermetically closed by the seal member has the discharge hole that allows communication between the storage chamber and the outside. Therefore, for example, even if the relay conductor generates heat by application of electric current thereto and this increases pressure inside the storage chamber, air in the storage chamber can be discharged through the discharge hole to the outside.

Thus, since an increase in pressure inside the storage chamber can be prevented, it is possible to reliably prevent application of excessive pressure to the seal member which may be caused by an increase in pressure, and thus to prevent a decrease in durability of the seal member.

The discharge hole may extend downward in the case. Thus, for example, moisture produced inside the storage chamber can be reliably discharged, through the discharge hole extending downward, to the outside under the action of gravity.

In the storage chamber according to the embodiment, the discharge hole may be formed below the relay conductor. Thus, moisture produced inside the storage chamber can be discharged through the discharge hole to the outside without adhering to the relay conductor.

The discharge hole may be provided with a labyrinth unit communicating therewith, the labyrinth unit having at least one path extending in a direction different from a direction in which the discharge hole extends. Thus, the labyrinth unit can prevent entry of moisture from outside the case through the discharge hole into the storage chamber.

The labyrinth unit may be a plug internally provided with a first path portion extending in the same direction as the discharge hole, and a second path portion communicating with the first path portion and orthogonal to the discharge hole. Thus, a labyrinth structure can be easily obtained by fitting the plug into the discharge hole.

Obviously, numerous modifications and variations of the present invention are possible in light of the above teachings. It is therefore to be understood that within the scope of the appended claims, the invention may be practiced otherwise than as specifically described herein.

What is claimed is:

1. A rotating electrical machine comprising:
   a stator having a conductor line wound thereon;
   a rotor disposed inside the stator;
   a case;
   a seal member;
   a terminal board to make an electrical connection between the conductor line and an external power line connected to a power supply, the terminal board being contained in the case and including a relay conductor and a storage chamber containing the relay conductor, the relay conductor being to make a connection between the conductor line and the external power line, the storage chamber being hermetically closed by the seal member with respect to an outside of the case, the storage chamber having a discharge hole that allows communication between the storage chamber and the outside; and
   a labyrinth structure extending within an interior of the discharge hole, the labyrinth structure having at least one path in communication with an inside of the storage chamber and extending in a direction different from a direction in which the discharge hole extends,
wherein the labyrinth structure comprises a plug having a head portion and a shaft portion, the head portion having a width that is greater than a width of the shaft portion, the head portion being located within a recess formed on a motor case, and the shaft portion extending within the discharge hole,
wherein the at least one path includes a path portion extending within the head portion, the path portion having an opening on a side of the head portion, and
wherein a gap is provided between the side of the head portion and a sidewall of the recess to allow communication between the opening of the path portion and an outer surface of the head portion via the gap.

2. The rotating electrical machine according to claim 1, wherein the discharge hole extends downward in the case.

3. The rotating electrical machine according to claim 1, wherein the discharge hole is formed in the storage chamber below the relay conductor.

4. The rotating electrical machine according to claim 1, wherein the labyrinth structure extends from the inside of the storage chamber through the discharge hole to an outside of the storage chamber.

5. The rotating electrical machine according to claim 1, wherein the recess is formed on an inner surface on the inside of the storage chamber, and the shaft portion extending from the head portion through the discharge hole to an outside of the storage chamber.

6. The rotating electrical machine according to claim 5, wherein the plug includes:
a first path portion extending within the shaft portion in a direction same as the direction in which the discharge hole extends; and
the path portion provided as a second path portion extending within the head portion in a direction orthogonal to the discharge hole and communicating with the first path portion.

7. The rotating electrical machine according to claim 1, wherein the plug includes:
a first path portion extending within the shaft portion in a direction same as the direction in which the discharge hole extends; and
the path portion provided as a second path portion extending within the head portion in a direction orthogonal to the discharge hole and communicating with the first path portion.

8. The rotating electrical machine according to claim 7, wherein the second path portion is provided closer to the inside of the storage chamber than the first path portion.

* * * * *